US012322972B2

(12) United States Patent
Brandão et al.

(10) Patent No.: US 12,322,972 B2
(45) Date of Patent: Jun. 3, 2025

(54) SINGLE-CONTROLLABLE LOW VOLTAGE MICROGRID, CONTROL PROCESS AND USE

(71) Applicants: PETRÓLEO BRASILEIRO S.A.—PETROBRAS, Rio de Janeiro (BR); UNIVERSIDADE FEDERAL DE MINAS GERAIS, Belo Horizonte (BR)

(72) Inventors: Danilo Iglesias Brandão, Belo Horizonte (BR); Geovane Luciano Dos Reis, Belo Horizonte (BR)

( * ) Notice: Subject to any disclaimer, the term of this patent is extended or adjusted under 35 U.S.C. 154(b) by 24 days.

(21) Appl. No.: 18/543,496

(22) Filed: Dec. 18, 2023

(65) Prior Publication Data

US 2024/0204531 A1     Jun. 20, 2024

(30) Foreign Application Priority Data

Dec. 19, 2022   (BR) .......................... 1020220258953

(51) Int. Cl.
  *H02J 3/38*   (2006.01)
  *H02J 3/18*   (2006.01)
  *H02J 3/32*   (2006.01)

(52) U.S. Cl.
  CPC ............... *H02J 3/381* (2013.01); *H02J 3/18* (2013.01); *H02J 3/32* (2013.01); *H02J 3/388* (2020.01); *H02J 2203/10* (2020.01); *H02J 2300/24* (2020.01)

(58) Field of Classification Search
  CPC .... H02J 3/38; H02J 3/381; H02J 3/388; H02J 3/18; H02J 3/32; H02J 2300/24; H02J 2203/10
  See application file for complete search history.

(56) References Cited

PUBLICATIONS

Caldognetto, T. et al., "Power-based Control Of Low-voltage Microgrids," IEEE Journal Of Emerging And Selected Topics In Power Electronics, 3(4):1056-1066 (Dec. 2015).

*Primary Examiner* — Robert L Deberadinis
(74) *Attorney, Agent, or Firm* — STERNE, KESSLER, GOLDSTEIN & FOX P.L.L.C.

(57) ABSTRACT

This technology refers to a control process for single-controllable low-voltage microgrids (Mgs) (SCM) having centralized communication. The process is based on the "Power-Based Control" (PBC) technique by adapting it to the context of SCMs through a modified PBC process (MPBC). The technology includes a process that provides the following technical effects: (1) sharing of active power and reactive power proportionately to the capacity of distributed energy resources (DERs or DGs) in the MG, for example, rendering the use of batteries based on different technologies (lead-acid, ion-lithium, etc.) compatible; (2) compensation for the current unbalance at the point of common coupling (PAC); (3) allows exploration of battery banks by balancing the charging status of storage elements; (4) allows implementation of the control process without knowing the electrical grid's parameters and topology; (5) is able to deal with the arbitrary connection of inverters into the MG, in addition to other advantages. The technology is applied in the technical field of equipment and infrastructure for the development of MGs.

6 Claims, No Drawings

SINGLE-CONTROLLABLE LOW VOLTAGE MICROGRID, CONTROL PROCESS AND USE

The instant technology refers to a control process for single-controllable low-voltage microgrids (MGs) (SCM) having centralized communication. The process is based on the "Power-Based Control" (PBC) technique by adapting it to the context of SCMs through a modified PBC process (MPBC). The technology includes a process that provides the following technical effects: (1) sharing of active power and reactive power proportionately to the capacity of distributed energy resources (DERs or DGs) in the MG, for example, rendering the use of batteries based on different technologies (lead-acid, ion-lithium, etc.) compatible; (2) compensation for the current unbalance at the point of common coupling (PAC); (3) allows exploration of battery banks by balancing the charging status of storage elements; (4) allows implementation of the control process without knowing the electrical grid's parameters and topology; (5) is able to deal with the arbitrary connection of inverters into the MG, in addition to other advantages. The technology is applied in the technical field of equipment and infrastructure for the development of MGs.

The PBC secondary control strategy offers a simple implementation that provides for the sharing of active and reactive power proportionately to the capabilities of existing DERs, in addition to controlling the power flow in the grid and compensating for unbalance in the PAC, without the need for prior knowledge of the grid parameters or the combination of other techniques, through a simple algebraic formulation (T. Caldognetto, S. Buso, P. Tenti, and D. I. Brandao, "," IEEE J. Emerg. Sel. Topics Power Electron., vol. 3, no. 4, pp. 1056-1066, December 2015).

There is no technology available in the state of the art that resembles the invention as proposed in the present patent application, which provides a control process for single-controllable low voltage microgrids (MGs) (SCM) and provides the following technical effects: (1) sharing of active power and reactive power proportionately to the capacity of distributed energy resources (DERs or DGs) in the MG, for example, rendering the use of batteries based on different technologies (lead-acid, ion-lithium, etc.) compatible; (2) compensation for the current unbalance at the point of common coupling (PAC); (3) allows exploration of battery banks by balancing the charging status of storage elements; (4) allows implementation of the control process without knowing the electrical grid's model and topology; (5) is able to deal with the arbitrary connection of inverters into the MG.

The "Energy Time Shift" (ETS) service is aimed at storing energy in batteries when its cost is low and supplying this energy when costs are high during the period of the day where the demand is the highest, between 5 pm and 8 pm, which is when the delivered electric energy has a better selling price. This approach maximizes profits and reduces the payback time for system investments. Moreover, to supply full capacity energy, which is a desirable characteristic in the context of the ETS service, it is essential for the battery banks to supply energy to meet the full demand proportionately to their individual capacities, since if a bank reaches its minimum state of charge (SOC) it may cause interruption of the ETS service and power imbalance relative to the main grid. Therefore, the technology proposed in the patent application, designated herein as MPBC, allows execution of the ETS service as it has means of exploring the battery banks by balancing the state of charge of energy storage elements.

The MPBC process proposed herein does not require detailed information on the MG (for example, line impedances or topology), and unlike many approaches, the MPBC process does not require primary control details (for example, details of the converter dynamics, current control, Phase-Locked Loop (PLL), and so on), which usually render the formulation more complex.

Thus, the MPBC simply requires the exchange of information between the central controller (CC) located at the secondary control layer and the layer of the primary controller (where the DERs are located) and tertiary controller (where the distribution system operator is located (DSO).

DETAILED DESCRIPTION OF THE TECHNOLOGY

This technology refers to a control process for single-controllable low-voltage microgrids (Mgs) (SCM) having centralized communication. The process is based on the "Power-Based Control" (PBC) technique by adapting it to the context of SCMs through a modified PBC process (MPBC). The technology includes a process that provides the following technical effects: (1) sharing of active power and reactive power proportionately to the capacity of distributed energy resources (DERs or DGs) in the MG, for example, rendering the use of batteries based on different technologies (lead-acid, ion-lithium, etc.) compatible; (2) compensation for the current unbalance at the point of common coupling (PAC); (3) allows exploration of battery banks by balancing the charging status of storage elements; (4) allows implementation of the control process without knowing the electrical grid's model and topology; (5) is able to deal with the arbitrary connection of inverters into the MG.

The single-controllable microgrid structure is formed by circuit breakers and contactors for connecting elements and for switching between islanded- or grid connected-operating modes, charges, distributed energy resources (DERs) equipped with battery banks, photovoltaic panels; a bus for connecting critical charges during MG operation in islanded mode; a central controller responsible for managing the MG in the islanded and connected modes of operation, which is responsible for the proportional sharing of active and reactive power between the DERs to meet the power references in the PCC with the main grid in connected mode and optimization of the DERs to meet the MG's requirement in islanded mode.

The control process for single-controllable low-voltage microgrids (Mgs) includes the following steps:

a) temporally delimiting a control cycle k;

b) measuring for the control cycle k the status of each $DER_{mn}$, where index mn represents the connections between phases in the three-phase system a, b and c (mn=ab,bc,ca) and j is a numeric identifier for each DER in the MG. Such status is represented by: (i) $P_{DER_{jmn}}(k)$, $Q_{DER_{jmn}}(k)$, output active and reactive power, respectively; (ii) actual maximum capacity to provide active power $P_{DER_{jmn}}^{max}(k)$, actual maximum capacity to absorb active power $P_{DER_{jmn}}^{min}(k)$, expressed as a negative value; (iii) maximum capacity of processing reactive power $Qmax_{DER_{jmn}}^{max}$ as calculated by expression (1), where $A_{DER_{jmn}}(k)$ is the DER apparent power:

$$Q_{DERj_{mn}}^{max}(k) = \sqrt{A_{DERj_{mn}}(k)^2 - P_{DERj_{mn}}(k)^2} \; ; \quad (1)$$

c) once the CC located at the secondary level has gathered all the necessary data packets from each DER of the MG, status of the MG is calculated in terms of power quantities. The first step calculates the total amounts of power and energy $E_{DER_{jmn}}(k)$ stored in the battery banks of DERs connected between mn phases according to expression (2):

$$[P_{DERt_{mn}}, Q_{DERt_{mn}}, P_{DERt_{mn}}^{max}, Q_{DERt_{mn}}^{max}, E_{DERt_{mn}}] = \quad (2)$$
$$\sum_{j=1}^{J} [P_{DERj_{mn}}, Q_{DERj_{mn}}, P_{DERj_{mn}}^{max}, Q_{DERj_{mn}}^{max}, E_{DERj_{mn}}];$$

d) converting the power computed per phase in the PCC ($P_{PCC_a}$, $P_{PCC_b}$ and $P_{PCC_c}$) by the central controller due to power star measurement between phases ($P_{PCC_{ab}}$, $P_{PCCD_c}$ and $P_{PCC_{ca}}$) using the conversion matrix (A) using expression (3) and analogously converting the reactive powers using expression (4), where $P_{PCC_m}$ and $Q_{PCC_m}$ are the active and reactive powers, respectively, as measured in m phase on the grid side at PCC:

$$\begin{bmatrix} P_{PCC_{ab}} \\ P_{PCC_{bc}} \\ P_{PCC_{ca}} \end{bmatrix} = \underbrace{\begin{bmatrix} 1 & 1 & -1 \\ -1 & 1 & 1 \\ 1 & -1 & 1 \end{bmatrix}}_{A} \cdot \begin{bmatrix} P_{PCC_a} \\ P_{PCC_b} \\ P_{PCC_c} \end{bmatrix} \quad (3)$$

$$\begin{bmatrix} Q_{PCC_{ab}} \\ Q_{PCC_{bc}} \\ Q_{PCC_{ca}} \end{bmatrix} = \underbrace{\begin{bmatrix} 1 & 1 & -1 \\ -1 & 1 & 1 \\ 1 & -1 & 1 \end{bmatrix}}_{A} \cdot \begin{bmatrix} Q_{PCC_a} \\ Q_{PCC_b} \\ Q_{PCC_c} \end{bmatrix}; \quad (4)$$

e) determining for control cycle k the active ($P_{LT_{mn}}(k)$) to reactive ($Q_{LT_{mn}}(k)$) power balance between MG phases (i.e., the sum of charges plus losses equals generation) using expressions 5 to 10:

$$P_{Lt_{ab}}(k) = P_{PCC_a}(k) + P_{PCC_b}(k) - P_{PCC_c}(k) + P_{DERt_{ab}}(k) \quad (5)$$

$$P_{Lt_{bc}}(k) = -P_{PCC_a}(k) + P_{PCC_b}(k) + P_{PCC_c}(k) + P_{DERt_{bc}}(k) \quad (6)$$

$$P_{Lt_{ca}}(k) = P_{PCC_a}(k) - P_{PCC_b}(k) + P_{PCC_c}(k) + P_{DERt_{ca}}(k) \quad (7)$$

$$Q_{Lt_{ab}}(k) = Q_{PCC_a}(k) + Q_{PCC_b}(k) - Q_{PCC_c}(k) + Q_{DERt_{ab}}(k) \quad (8)$$

$$Q_{Lt_{bc}}(k) = -Q_{PCC_a}(k) + Q_{PCC_b}(k) + Q_{PCC_c}(k) + Q_{DERt_{bc}}(k) \quad (9)$$

$$Q_{Lt_{ca}}(k) = Q_{PCC_a}(k) - Q_{PCC_b}(k) + Q_{PCC_c}(k) + Q_{DERt_{ca}}(k); \quad (10)$$

f) by knowing the power balance, the CC calculates the active and reactive power references ($P_{DER_{tmn}}^*(k+1)$, $Q_{DERt_{mn}}^*(k+1)$) to be provided by the MG DERs in the next control time cycle (k+1) using expressions 11 to 16, where $P_{PCC_m}^*(k+1)$ and $Q_{PCC_m}^*(k+1)$ are, respectively, the active and reactive power references associated with the power flow per phase in the PCC, being defined by the tertiary controller layer:

$$P_{DERt_{ab}}^*(k+1) = P_{Lt_{ab}}(k) - P_{PCC_a}^*(k+1) - P_{PCC_b}^*(k+1) + P_{PCC_c}^*(k+1) \quad (11)$$

$$P_{DERt_{bc}}^*(k+1) = P_{Lt_{bc}}(k) + P_{PCC_a}^*(k+1) - P_{PCC_b}^*(k+1) - P_{PCC_c}^*(k+1) \quad (12)$$

$$P_{DERt_{ca}}^*(k+1) = P_{Lt_{ca}}(k) - P_{PCC_a}^*(k+1) + P_{PCC_b}^*(k+1) - P_{PCC_c}^*(k+1) \quad (13)$$

$$Q_{DERt_{ab}}^*(k+1) = Q_{Lt_{ab}}(k) - Q_{PCC_a}^*(k+1) - Q_{PCC_b}^*(k+1) + Q_{PCC_c}^*(k+1) \quad (14)$$

$$Q_{DERt_{bc}}^*(k+1) = Q_{Lt_{bc}}(k) + Q_{PCC_a}^*(k+1) - Q_{PCC_b}^*(k+1) - Q_{PCC_c}^*(k+1) \quad (15)$$

$$Q_{DERt_{ca}}^*(k+1) = Q_{Lt_{ca}}(k) - Q_{PCC_a}^*(k+1) + Q_{PCC_b}^*(k+1) - Q_{PCC_c}^*(k+1); \quad (16)$$

g) the CC calculates the scalar coefficients for the $J^{th}$ DERs connected between the "mn" $\alpha_{P_{mn}}$, $\alpha_{Q_{mn}}$ phases (all varying within the range [−1, 1]). The active power is controlled by coefficient $\alpha_P$, while the reactive power is controlled by coefficient $\alpha_Q$. Scalar coefficients are calculated according to expressions 17 to 20, being dependent $P_{DERt}^*$ and $Q_{DERt}^*$ as compared to the maximum ($P_{DERt}^{max}$) and minimum ($P_{PERt}^{min}$) values. Sign $\alpha_{P_{mn}}$ indicates active power injection when positive and or active power storage when negative, while sign $\alpha_{Q_{mn}}$ indicates capacitive reactive power injection (if negative) or inductive reactive absorption (if positive). After calculating $\alpha_{P_{mn}}$ and $\alpha_{Q_{mn}}$, they are transmitted to all DERs:

$$\text{If } P_{DERt_{mn}}^*(k+1) < P_{DERt_{mn}}^{min}(k) \text{ then } \alpha_{P_{mn}} = -1 \quad (17)$$

$$\quad (18)$$

$$\text{If } P_{DERt_{mn}}^{min}(k) \le P_{DERt_{mn}}^*(k+1) \le P_{DERt_{mn}}^{max}(k) \text{ then } \alpha_{P_{mn}} = \frac{P_{DERt_{mn}}^*(k+1)}{P_{DERt_{mn}}^{max}(k)}$$

$$\text{If } P_{DERt_{mn}}^* > P_{DERt_{mn}}^{max}(k) \text{ then } \alpha_{P_{mn}} = 1 \quad (19)$$

$$\text{If } P_{DERt_{mn}}^* > P_{DERt_{mn}}^{max}(k) \text{ then } \alpha_{P_{mn}} = 1; \quad (20)$$

h) if the MG is provided with different battery banks in terms of aging and/or technology, then power sharing cannot only be proportional to the power capacity of the DERs, but must also consider usable power. Therefore, it is necessary to maintain equalization of the usable power between all battery banks dispersed in the MG, in order to reach their maximum and minimum SOC values at approximately the same instant of time. Therefore, the scalar coefficients are weighted in terms of usable power to ensure maximum usage of the battery banks. From the usable power of each bank, the CC calculates the average power according to expression 21 and then applies expression 22 to weight the scalar coefficients to be sent to the respective DERs:

$$E_{avg}(k) = \frac{E_{DERt_{ab}}(k) + E_{DERt_{bc}}(k) + E_{DERt_{ca}}(k)}{J(k)} \quad (21)$$

-continued $$Se\ P_{DER t_{mn}}^{min}(k) \leq P_{DER t_{mn}}^{*}(k+1) \leq P_{DER t_{mn}}^{max}(k) \quad (22)$$

$$Then\ \alpha_{P_{mn}} = \frac{P_{DER t_{mn}}^{*}(k+1)}{P_{DER t_{mn}}^{max}(k)} \cdot \frac{E_{DER t_{mn}}(k)}{E_{avg}(k)};$$

i) after the DERs receive the scalar coefficients sent by the CC, they calculate their individual active and reactive power references to be used in their internal control loops (i.e. primary controller layer) according to their individual maximum power capacity. Table 1 is used to obtain the power references defined in the local control of the DERs for different values of scalar coefficients:

TABLE 1

Power references implemented in the local control of DERs.

| Scalar coefficients | Power reference for the DER |
|---|---|
| $\alpha_{P_{mn}} = -1$ | $P^{*}_{DERj_{mn}} = P_{DERj_{mn}}^{min}$ |
| $-1 < \alpha_{P_{mn}} \leq 0$ | $P^{*}_{DERj_{mn}} = \alpha_{P_{mn}} \cdot P_{DERj_{mn}}^{min}$ |
| $0 < \alpha_{P_{mn}} < 1$ | $P^{*}_{DERj_{mn}} = \alpha_{P_{mn}} \cdot P_{DERj_{mn}}^{max}$ |
| $\alpha_{P_{mn}} = 1$ | $P^{*}_{DERj_{mn}} = P_{DERj_{mn}}^{max}$ |
| $-1 \leq \alpha_{Q_{mn}} \leq 1$ | $Q^{*}_{DERj_{mn}} = \alpha_{Q_{mn}} \cdot Q_{DERj_{mn}}^{max}$ |

The present invention can be better understood through the following non-limiting examples.

Example 1-Exemplary Implementation of the Technology

A single-controllable three-phase four-wire MG was implemented, comprising: a programmable 4-quadrant 30 kVA source from the ACS, which is responsible for forming the grid during islanded operation of the MG; contactors and circuit breakers responsible for switching between islanded or grid connected operating modes; circuit breakers and contactors to disconnect non-critical charges in islanded mode; photovoltaic plant with a 12 kW three-phase inverter from PHB, model PHB12KN-DT; programmable 12 kVA, 4 quadrant charge, of model NHR 9430; a specific bus for connecting critical charges; three SMA Sunny Island 6.0H inverters provided with three different 5 kW and 15 kWh battery banks of usable power: lead-acid (48V-1320 Ah), six sets in parallel composed of four batteries (12MS234 from Moura); lithium-ion (48V-500 Ah), five modules in parallel (UPLFP48 from Unipower); sodium-nickel (48V-400 Ah), two modules in parallel (48TL200 from FZSONICK). The SMA DERs with their respective banks were connected in the delta configuration due to their nominal operating voltage. The MG was coordinated through a central controller (CC) implemented on the Raspberry Pi B3$_+$ minicomputer. The Power node device is responsible for measuring electrical quantities in the MG PCC and is in star configuration. The Power node measures voltages and currents in the MG PCC and calculates the active and reactive powers, transferring them to the central controller (CC) through a ModBus RTU communication link (RS-485). It further disconnects non-critical charges (by activating contactors) during operation of the MG in islanded mode. CC interoperability with SMA DERs is based on communication via ModBus TCP. The proposed MPBC algorithm was implemented by using the "Node-RED" programming tool, embedded on the Pi B3$_+$ Raspberry.

In the microgrid implemented and controlled by the MPBC, the following performance characteristics were obtained:

1) Communication latency was limited by the time required to update the SMA DERs parameters via ModBus TCP communication, which in practice resulted in a time of 45 seconds. For stable operation, the interval used in the CC instance to define a control cycle required an update interval of 60 seconds in practice.
2) The "Energy Time Shift" (ETS) service was implemented in the MG between 5 pm and 8 pm, the three battery banks with different technologies were able to supply 5 kW power to the MG uninterruptedly during the period of greatest demand.

To restore the reactive power setpoint values, the latency found in the microgrid implemented and controlled by the MPBC was 40 to 45 seconds, which is explained by the inherent limitation in the inverter update time.

Mitigation of power unbalance in the MG PCC by the MPBC was assessed in light of the experimental instance where an unbalanced resistive charge of: 0.5 kW, 1 kW and 1.5 kW is connected to a, b and c phases, respectively. At 200 s, the MPBC is activated, and the PCC power is controlled in $P_{P_{cc}}$*=1 kW. Then, the PCC power reference changes to zero (at 680 s), to 0.5 kW at 860 s and to zero again at 1100 s, always providing balanced power to the main grid. Finally, at 1380 s, the MPBC is disabled, resulting again in power imbalance at the PCC.

The invention claimed is:

1. A control process for a single-controllable low voltage microgrid, the control process comprising:
   a) temporally delimiting a control cycle k;
   b) measuring for control cycle k found in step "a" the status of each DER$_{mn}$, where index mn represents the connections between phases in the three-phase system a, b and c (mn=ab,bc,ca) and j is a numeric identifier for each DER in the microgrid, wherein such status is represented by:
      (i) $P_{DERj_{mn}}(k)$, $Q_{DERj_{mn}}(k)$, output active and reactive power, respectively;
      (ii) actual maximum capacity to provide active power $P_{DERj_{mn}}^{max}(k)$, actual maximum capacity to absorb active power $p_{DERj_{mn}}^{min}(k)$, expressed as a negative value;
      (iii) maximum capacity of processing reactive power $Q_{DERj_{mn}}^{max}$ as calculated by expression (1), where $A_{DERj_{mn}}(k)$ is the DER apparent power:

$$Q_{DERj_{mn}}^{max}(k) = \sqrt{A_{DERj_{mn}}(k)^2 - P_{DERj_{mn}}(k)^2}; \quad (1)$$

c) once a central controller located at a secondary level has gathered all the required data packets from each DER in the microgrid, calculating the status of the microgrid in terms of power quantities, with the first step calculating the total power and energy $E_{DERj_{mn}}(k)$ quantities stored in DER battery banks connected between the mn phases using expression (2):

$$[P_{DER t_{mn}}, Q_{DER t_{mn}}, P_{DER t_{mn}}^{max}, Q_{DER t_{mn}}^{max}, E_{DER t_{mn}}] = \quad (2)$$
$$\sum_{j=1}^{J}[P_{DERj_{mn}}, Q_{DERj_{mn}}, P_{DERj_{mn}}^{max}, Q_{DERj_{mn}}^{max}, E_{DERj_{mn}}];$$

d) converting the power computed per phase in the PCC ($P_{PCC_a}$, $P_{PCC_b}$ and $P_{PCC_c}$) by the central controller due to power star measurement between phases ($P_{PCC_{ab}}$, $P_{PCC_{bc}}$ and $P_{PCC_{ca}}$) using conversion matrix (A) using expression (3) and analogously converting the reactive powers using expression (4), where $P_{PCCm}$ and $Q_{PCCm}$ are the active and reactive powers, respectively, as measured in m phase on the grid side at the PCC:

$$\begin{bmatrix} P_{PCC_{ab}} \\ P_{PCC_{bc}} \\ P_{PCC_{ca}} \end{bmatrix} = \underbrace{\begin{bmatrix} 1 & 1 & -1 \\ -1 & 1 & 1 \\ 1 & -1 & 1 \end{bmatrix}}_{A} \cdot \begin{bmatrix} P_{PCC_a} \\ P_{PCC_b} \\ P_{PCC_c} \end{bmatrix} \quad (3)$$

$$\begin{bmatrix} Q_{PCC_{ab}} \\ Q_{PCC_{bc}} \\ Q_{PCC_{ca}} \end{bmatrix} = \underbrace{\begin{bmatrix} 1 & 1 & -1 \\ -1 & 1 & 1 \\ 1 & -1 & 1 \end{bmatrix}}_{A} \cdot \begin{bmatrix} Q_{PCC_a} \\ Q_{PCC_b} \\ Q_{PCC_c} \end{bmatrix}; \quad (4)$$

e) determining for control cycle k the active ($P_{Lt_{mn}}(k)$) to reactive ($Q_{Lt_{mn}}(k)$) power balance between microgrid phases based on expressions 5 to 10:

$$P_{Lt_{ab}}(k) = P_{PCC_a}(k) + P_{PCC_b}(k) - P_{PCC_c}(k) + P_{DERt_{ab}}(k) \quad (5)$$

$$P_{Lt_{bc}}(k) = -P_{PCC_a}(k) + P_{PCC_b}(k) + P_{PCC_c}(k) + P_{DERt_{bc}}(k) \quad (6)$$

$$P_{Lt_{ca}}(k) = P_{PCC_a}(k) - P_{PCC_b}(k) + P_{PCC_c}(k) + P_{DERt_{ca}}(k) \quad (7)$$

$$Q_{Lt_{ab}}(k) = Q_{PCC_a}(k) + Q_{PCC_b}(k) - Q_{PCC_c}(k) + Q_{DERt_{ab}}(k) \quad (8)$$

$$Q_{Lt_{bc}}(k) = -Q_{PCC_a}(k) + Q_{PCC_b}(k) + Q_{PCC_c}(k) + Q_{DERt_{bc}}(k) \quad (9)$$

$$Q_{Lt_{ca}}(k) = Q_{PCC_a}(k) - Q_{PCC_b}(k) + Q_{PCC_c}(k) + Q_{DERt_{ca}}(k); \quad (10)$$

f) calculating by the central controller, based on the power balance, the active and reactive power references ($P_{DERt_{mn}}*(k+1)$, $Q_{DERt_{mn}}*(k+1)$) to be provided by the microgrid DERs in the next control time cycle (k+1) using expressions 11 to 16, where $P_{PCC_m}*(k+1)$ and $Q_{PCC_m}*(k+1)$ are, respectively, the active and reactive power references associated with the power flow per phase in the PCC, being defined by the tertiary controller layer:

$$P^*_{DERt_{ab}}(k+1) = P_{Lt_{ab}}(k) - P^*_{PCC_a}(k+1) - P^*_{PCC_b}(k+1) + P^*_{PCC_c}(k+1) \quad (11)$$

$$P^*_{DERt_{bc}}(k+1) = P_{Lt_{bc}}(k) + P^*_{PCC_a}(k+1) - P^*_{PCC_b}(k+1) - P^*_{PCC_c}(k+1) \quad (12)$$

$$P^*_{DERt_{ca}}(k+1) = P_{Lt_{ca}}(k) - P^*_{PCC_a}(k+1) + P^*_{PCC_b}(k+1) - P^*_{PCC_c}(k+1) \quad (13)$$

$$Q^*_{DERt_{ab}}(k+1) = Q_{Lt_{ab}}(k) - Q^*_{PCC_a}(k+1) - Q^*_{PCC_b}(k+1) + Q^*_{PCC_c}(k+1) \quad (14)$$

$$Q^*_{DERt_{bc}}(k+1) = Q_{Lt_{bc}}(k) + Q^*_{PCC_a}(k+1) - Q^*_{PCC_b}(k+1) - Q^*_{PCC_c}(k+1) \quad (15)$$

$$Q^*_{DERt_{ca}}(k+1) = Q_{Lt_{ca}}(k) - Q^*_{PCC_a}(k+1) + Q^*_{PCC_b}(k+1) - Q^*_{PCC_c}(k+1); \quad (16)$$

g) calculating, by the central controller, the scalar coefficients for the $J^{th}$ DERs connected between the "mn" $\alpha_{P_{mn}}$ and $\alpha_{Q_{mn}}$ phases; wherein the scalar coefficients are within a range of [−1,1]; wherein the active power is controlled by coefficient $\alpha_P$; wherein the reactive power is controlled by coefficient $\alpha_Q$, o; wherein the scalar coefficients are calculated using expressions 17 to 20, being dependent on $P_{DERt}*$ and $Q_{DERt}*$ as compared to the maximum ($P_{DERt}^{max}$) and minimum ($p_{DERt}^{min}$) values; wherein sign $\alpha_{P_{mn}}$ indicates active power injection when positive and or active power storage when negative; wherein a negative value of sign $\alpha_{Q_{mn}}$ indicates injection of capacitive reactive power; wherein a positive value of sign $\alpha_{Q_{mn}}$ indicates absorption of inductive reactive power; and wherein after calculating $\alpha_{P_{mn}}$ and $\alpha_{Q_{mn}}$ the calculated values are transmitted to all DERs:

If $P^*_{DERt_{mn}}(k+1) < P^{min}_{DERt_{mn}}(k)$ then $\alpha_{P_{mn}} = -1$ (17)

If $P^{min}_{DERt_{mn}}(k) \le P^*_{DERt_{mn}}(k+1) \le P^{max}_{DERt_{mn}}(k)$ then $\alpha_{P_{mn}} = \frac{P^*_{DERt_{mn}}(k+1)}{P^{max}_{DERt_{mn}}(k)}$ (18)

If $P^*_{DERt_{mn}} > P^{max}_{DERt_{mn}}(k)$ then $\alpha_{P_{mn}} = 1$ (19)

If $P^*_{DERt_{mn}} > P^{max}_{DERt_{mn}}(k)$ then $\alpha_{P_{mn}} = 1$; (20)

h) wherein if the microgrid is provided with different battery banks in terms of aging and/or technology, energy sharing is proportional to the energy capacity of the DERs and the usable energy to maintain equalization of usable energy between all battery banks dispersed in the microgrid in order to reach their maximum and minimum SOC values at approximately the same instant of time, wherein the scalar coefficients are weighted in terms of usable energy to ensure maximum usage of the battery banks based on the usable capacity of each battery bank, and wherein the central controller is configured to calculate the average energy using expression 21 and then applies expression 22 to weight the scalar coefficients to be sent to the respective DERs:

$$E_{avg}(k) = \frac{E_{DERt_{ab}}(k) + E_{DERt_{bc}}(k) + E_{DERt_{ca}}(k)}{J(k)} \quad (21)$$

$$Se\ P^{min}_{DERt_{mn}}(k) \le P^*_{DERt_{mn}}(k+1) \le P^{max}_{DERt_{mn}}(k) \quad (22)$$

$$\text{Then } \alpha_{P_{mn}} = \frac{P^*_{DERt_{mn}}(k+1)}{P^{max}_{DERt_{mn}}(k)} \cdot \frac{E_{DERt_{mn}}(k)}{E_{avg}(k)};$$

i) wherein after the DERs receive the scalar coefficients sent by the central controller, the DERs calculate their individual active and reactive power references to be used in their internal control loops, according to their individual maximum power capacity, and wherein Table 1 is used to obtain power references defined in DER local controller for different values of scalar coefficients:

TABLE 1

| Power references implemented in the DER local controller | |
|---|---|
| Scalar coefficients | Power reference for the DER |
| $\alpha_{Pmn} = -1$ | $P^*_{DERj_{mn}} = P_{DERj_{mn}}^{min}$ |
| $-1 < \alpha_{Pmn} \le 0$ | $P^*_{DERj_{mn}} = \alpha_{P_{mn}} \cdot P_{DERj_{mn}}^{min}$ |

TABLE 1-continued

Power references implemented in the DER local controller

| Scalar coefficients | Power reference for the DER |
|---|---|
| $0 < \alpha_{Pmn} < 1$ | $P^*_{DERj_{mn}} = \alpha_{P_{mn}} \cdot P_{DERj_{mn}}^{max}$ |
| $\alpha_{Pmn} = 1$ | $P^*_{DERj_{mn}} = P_{DERj_{mn}}^{max}$ |
| $-1 \leq \alpha_{Qmn} \leq 1$ | $Q^*_{DERj_{mn}} = \alpha_{Q_{mn}} \cdot Q_{DERj_{mn}}^{max}$ |

2. A single-controllable low voltage microgrid, wherein the microgrid is controlled by the process as defined in claim 1, and wherein the microgrid comprises switches for connecting elements and for switching between islanded or grid connected modes of operation, charges, distributed energy resources,
  wherein the distributed energy resources comprises:
    batteries, battery banks, or photovoltaic panels,
    inverters for a connection interface within the microgrid,
    an AC bus, wherein the AC bus is configured to connect critical charges during islanded mode operation of the microgrid, and
    a central controller to allow sharing of supply of active and reactive power between the distributed energy resources to control the active and reactive power exchanged with the main grid and to control the switching between islanded and main grid-connected modes.

3. The single-controllable low voltage microgrid of claim 2, wherein the microgrid is implemented by:
  a programmable 4-quadrant 30 kVA source from ACS configured to form a grid during islanded operation of the microgrid;
  contactors and circuit breakers configured to switch between islanded or grid-connected operation modes;
  circuit breakers and contactors configured to disconnect non-critical charges in islanded mode;
  a photovoltaic plant with a 12 kW three-phase inverter;
  a programmable 12 kVA 4-quadrant charge;
  a specific bus for connecting critical charges;
  three inverters provided with provided with three different battery banks of 5 kW and 15 kWh of usable energy, the three inverters comprising:
    lead-acid (48V-1320 Ah), six sets in parallel composed of four batteries,
    lithium-ion (48V-500 Ah), five modules in parallel, and
    sodium-nickel (48V-400 Ah), two modules in parallel,
  wherein SMA distributed energy resources DERs with their respective banks being connected in delta configuration due to their nominal operating voltage,
  wherein the microgrid is coordinated through a central controller implemented in a minicomputer,
  wherein a power node device is configured to measure electrical quantities in the microgrid PCC, wherein the power node device is in star configuration, wherein the power node device measures voltages and currents at the microgrid PCC, calculates active and reactive powers, and transfers them to the central controller through a ModBus RTU (RS-485) communication link, and
  wherein the power node device is configured to perform shutdowns of non-critical charges by activating contactors during operation of the microgrid in islanded mode, wherein the interoperability of the central controller with the SMA DERs is based on communication via ModBus TCP, the proposed MPBC algorithm being implemented using the "Node-RED" programming tool embedded in the minicomputer.

4. A method of using the control process for the single-controllable low voltage microgrid as defined in claim 1, wherein the control process controls a single-controllable low voltage microgrid.

5. A method of using the control process for single-controllable low voltage microgrid as defined in claim 4, wherein the control process controls a single-controllable low voltage microgrid wherein the microgrid comprises switches for connecting elements and for switching between islanded or grid connected modes of operation, charges, distributed energy resources,
  wherein the distributed energy resources comprises: batteries, battery banks, or photovoltaic panels,
  inverters for a connection interface within the microgrid,
  an AC bus, wherein the AC bus is configured to connect critical charges during islanded mode operation of the microgrid, and
  a central controller to allow sharing of supply of active and reactive power between the distributed energy resources, to control the active and reactive power exchanged with the main grid, and to control the switching between islanded and grid-connected modes.

6. The method of claim 5, wherein the microgrid is implemented by:
  a programmable 4-quadrant 30 kVA source from ACS, wherein the programmable 4-quadrant 30 kVA source is configured to form a grid during islanded operation of the microgrid;
  contactors and circuit breakers configured to switch between islanded or grid-connected operation modes;
  circuit breakers and contactors configured to disconnect non-critical charges in islanded mode,;
  a photovoltaic plant with a 12 kW three-phase inverter;
  a programmable 12 kVA 4-quadrant charge;
  a specific bus for connecting critical charges;
  three inverters provided with provided with three different battery banks of 5 kW and 15 kWh of usable energy, the three inverters comprising:
    a lead-acid inverter (48V-1320 Ah), six sets in parallel composed of four batteries,
    a lithium-ion inverter (48V-500 Ah), five modules in parallel, and
    a sodium-nickel inverter (48V-400 Ah), two modules in parallel,
  wherein SMA distributed energy resources DERs with their respective banks being connected in delta configuration due to their nominal operating voltage,
  wherein the microgrid is coordinated through a central controller implemented in a minicomputer,
  wherein a power node device is configured to measure electrical quantities in the microgrid PCC, wherein the power node device is in star configuration, wherein the power node device measures voltages and currents at the microgrid PCC, calculates active and reactive powers, and transfers them to the central controller through a ModBus RTU (RS-485) communication link, and wherein the power node device is configured to perform shutdowns of non-critical charges by activating contactors during operation of the microgrid in islanded mode,
  wherein the interoperability of the central controller with the SMA DERs is based on communication via ModBus TCP, the proposed MPBC algorithm being implemented using the "Node-RED" programming tool embedded in the minicomputer.

* * * * *

UNITED STATES PATENT AND TRADEMARK OFFICE
CERTIFICATE OF CORRECTION

PATENT NO. : 12,322,972 B2  
APPLICATION NO. : 18/543496  
DATED : June 3, 2025  
INVENTOR(S) : Brandão et al.

Page 1 of 1

It is certified that error appears in the above-identified patent and that said Letters Patent is hereby corrected as shown below:

In the Claims

In Column 8, Claim 1, Line 12, delete "$\alpha_{Qmn}$" and insert --$\alpha_{Qmn}$,--, therefor.

In Column 8, Claim 1, Line 54, delete "loops," and insert --loops--, therefor.

In Column 9, Claim 2, Line 27, delete "and main" and insert --and--, therefor.

In Column 10, Claim 5, Line 8, delete "microgrid" and insert --microgrid,--, therefor.

In Column 10, Claim 6, Line 32, delete "mode,;" and insert --mode;--, therefor.

Signed and Sealed this  
Second Day of September, 2025

Coke Morgan Stewart  
*Acting Director of the United States Patent and Trademark Office*